US011439953B2

(12) United States Patent
Nicoll et al.

(10) Patent No.: US 11,439,953 B2
(45) Date of Patent: Sep. 13, 2022

(54) BRINE CONCENTRATION

(71) Applicant: Surrey Aquatechnology Limited, Guildford (GB)

(72) Inventors: Peter George Nicoll, Guildford (GB); Brian James Moore, Guildford (GB)

(73) Assignee: Surrey Aquatechnology Limited, Guilford Surrey (GB)

( * ) Notice: Subject to any disclaimer, the term of this patent is extended or adjusted under 35 U.S.C. 154(b) by 243 days.

(21) Appl. No.: 16/852,134

(22) Filed: Apr. 17, 2020

(65) Prior Publication Data
US 2020/0316526 A1 Oct. 8, 2020

Related U.S. Application Data

(63) Continuation of application No. 16/562,153, filed on Sep. 5, 2019, now abandoned, which is a continuation
(Continued)

(30) Foreign Application Priority Data

Feb. 2, 2015 (GB) ....................................... 1501684
Feb. 1, 2016 (WO) ................ PCT/GB2016/050222

(51) Int. Cl.
*B01D 61/00* (2006.01)
*B01D 61/02* (2006.01)
(Continued)

(52) U.S. Cl.
CPC ......... *B01D 61/022* (2013.01); *B01D 61/002* (2013.01); *B01D 61/025* (2013.01);
(Continued)

(58) Field of Classification Search
CPC .. B01D 61/022; B01D 61/025; B01D 61/027; B01D 2317/025; C02F 2301/046
See application file for complete search history.

(56) References Cited

U.S. PATENT DOCUMENTS

| 6,113,797 A | 9/2000 | Al-Samadi |
| 2006/0096920 A1 | 5/2006 | Ayala et al. |

(Continued)

FOREIGN PATENT DOCUMENTS

| AU | 2008202302 A1 | 12/2009 |
| CN | 103193294 A | 7/2013 |

(Continued)

OTHER PUBLICATIONS

International Search Report and Written Opinion of PCT/GB2016/050222 dated May 17, 2016, 13 pages.
(Continued)

*Primary Examiner* — Bradley R Spies
(74) *Attorney, Agent, or Firm* — Squire Patton Boggs (US) LLP

(57) ABSTRACT

A process for separating solvent from a feed solution, said process comprising: contacting a feed solution comprising solutes dissolved in a solvent with one side of a nanofiltration membrane, applying hydraulic pressure to the feed solution, such that solvent and some of the dissolved salts from the feed solution flow through the nanofiltration membrane to provide a permeate solution on the permeate-side of the nanofiltration membrane and a concentrated solution on the retentate-side of the nanofiltration membrane; contacting the permeate solution from the nanofiltration membrane with one side of a reverse osmosis membrane and applying hydraulic pressure to the permeate solution, such that solvent from the permeate solution flows through the reverse osmosis membrane to leave a concentrated solution on the retentate-side of the reverse osmosis membrane, using the concentrated solution from the retentate-side of the reverse osmosis membrane as at least part of the feed solution to the nanofiltration membrane; withdrawing at least a portion of
(Continued)

the concentrated solution from the retentate-side of the nanofiltration membrane.

20 Claims, 4 Drawing Sheets

Related U.S. Application Data of application No. 15/548,081, filed as application No. PCT/GB2016/050222 on Feb. 1, 2016, now abandoned.

(51) Int. Cl.
    *B01D 61/58*     (2006.01)
    *C02F 1/44*     (2006.01)
    *C02F 1/04*     (2006.01)
    *C02F 1/08*     (2006.01)
    *C02F 103/08*     (2006.01)

(52) U.S. Cl.
    CPC ........... *B01D 61/027* (2013.01); *B01D 61/58* (2013.01); *C02F 1/441* (2013.01); *C02F 1/442* (2013.01); *C02F 1/445* (2013.01); *B01D 2311/06* (2013.01); *B01D 2311/08* (2013.01); *B01D 2311/12* (2013.01); *B01D 2311/25* (2013.01); *B01D 2317/025* (2013.01); *C02F 1/04* (2013.01); *C02F 2103/08* (2013.01); *C02F 2301/046* (2013.01)

(56) References Cited

U.S. PATENT DOCUMENTS

| | | |
|---|---|---|
| 2008/0217244 A1 | 9/2008 | Gaid |
| 2010/0193436 A1 | 8/2010 | Ruehr et al. |
| 2013/0020259 A1 | 1/2013 | Wallace |
| 2013/0264285 A1 | 10/2013 | Macintosh et al. |
| 2014/0021135 A1 | 1/2014 | Sawyer et al. |
| 2015/0014248 A1 | 1/2015 | Herron et al. |
| 2015/0376033 A1 | 12/2015 | Tao et al. |
| 2016/0052812 A1 | 2/2016 | Chidambaran et al. |
| 2016/0136577 A1 | 5/2016 | McGovern et al. |

FOREIGN PATENT DOCUMENTS

| | | |
|---|---|---|
| KR | 10-0877384 B1 | 1/2009 |
| WO | WO 2008/108636 A1 | 9/2008 |
| WO | WO 2013/023249 A1 | 2/2013 |
| WO | WO 2014/144778 A1 | 9/2014 |

OTHER PUBLICATIONS

Combined Search and Examination Report under Sections 17 and 18(3) for Application No. GB1501684.3 dated Jun. 29, 2015; 7 pages.

BRINE CONCENTRATION

CROSS-REFERENCE TO RELATED APPLICATION

This application is a Continuation of U.S. application Ser. No. 16/562,153, filed Sep. 5, 2019, which is a Continuation of U.S. application Ser. No. 15/548,081, filed Aug. 1, 2017, which is a National Stage Entry of PCT/GB2016/050222, filed Feb. 1, 2016, the entire content of which is herein incorporated by reference in its entirety for all purposes.

BACKGROUND

The present invention relates to a process for separating a solvent, for example, water from a feed solution. In particular but not exclusively, the present invention relates to a process for the purification of water.

Various methods of water purification and concentration are known. An example of such a method is reverse osmosis. In reverse osmosis, water is forced from a region of high solute concentration through a semipermeable membrane to a region of low solute concentration by applying a pressure in excess of the osmotic pressure of the high solute concentration solution. Reverse osmosis is commonly used, for example, to obtain drinking water from seawater. Reverse osmosis is also used to separate water from, for example, industrial waste streams. By using reverse osmosis to treat industrial waste streams, it is possible to generate relatively clean water from industrial waste, while reducing the volume of undesirable waste requiring disposal or further treatment.

Reverse osmosis requires relatively high pressures to be exerted on the high solute concentration side of the membrane. For instance, to desalinate seawater by conventional reverse osmosis techniques, pressures as high as 82 barg are commonly used to increase the recovery of product water. This places a significant energy burden on desalination methods that rely on conventional reverse osmosis. Moreover, streams having higher solute concentrations than seawater may require even higher hydraulic pressures to be applied. Many commercially available reverse osmosis membranes are unsuitable for withstanding hydraulic pressures of greater than 82 barg. Accordingly, this can impose a limitation on the concentration of feed solutions that can be treated using commercially available reverse osmosis membrane, which effectively limits the maximum concentration of the concentrated feed stream to an osmotic pressure equivalent to the maximum hydraulic pressure rating of the reverse osmosis membrane and pressure vessel.

DESCRIPTION

According to the present invention, there is provided a process for separating solvent from a feed solution, said process comprising:

contacting a feed solution comprising solute dissolved in a solvent with one side of a nanofiltration membrane, applying hydraulic pressure to the feed solution, such that solvent and some of the dissolved solute from the feed solution flow through the nanofiltration membrane to provide a permeate solution on the permeate-side of the nanofiltration membrane and a concentrated solution on the retentate-side of the nanofiltration membrane;

contacting the permeate solution from the nanofiltration membrane with one side of a reverse osmosis membrane and applying hydraulic pressure to the permeate solution, such that solvent from the permeate solution flows through the reverse osmosis membrane to leave a concentrated solution on the retentate-side of the reverse osmosis membrane, using the concentrated solution from the retentate-side of the reverse osmosis membrane as at least part of the feed solution to the nanofiltration membrane; and withdrawing at least a portion of the concentrated solution from the retentate-side of the nanofiltration membrane.

The withdrawn portion of concentrated solution from the retentate-side of the nanofiltration membrane may be disposed of either directly or indirectly. In one example, the withdrawn portion may be combined with another solution prior to disposal. In one embodiment, the withdrawn portion may be further concentrated prior to disposal. Alternatively, the withdrawn portion may be contacted with one side of a forward osmosis membrane to draw water from source water on the opposite side of the forward osmosis membrane by forward osmosis. Where forward osmosis is defined as any osmotically driven membrane process, such as pressure enhanced osmosis, pressure assisted osmosis, osmosis and pressure retarded osmosis.

In the present invention, a feed solution comprising salts dissolved in a solvent is contacted with one side of a nanofiltration membrane. The feed solution may be saline ground water or surface water, brine, seawater or a waste stream. A nanofiltration membrane is selected because it is a relatively "loose" membrane with a relatively high solute permeability. Accordingly, as well as solvent, significant amounts of solute (e.g. salts) from the feed solution pass across the nanofiltration membrane to provide a permeate with a relatively high solute concentration. Because the permeate has a relatively high solute concentration, the hydraulic pressure required to maintain the desired level of flux across the nanofiltration membrane is relatively low compared, for example, to the hydraulic pressure required with, for example, conventional reverse osmosis membranes having a lower solute permeability.

In some embodiments, the feed solution is a waste stream. The feed solution may contain multivalent cations and/or multivalent anions. Examples of multivalent cations include divalent cations and trivalent cations Examples of divalent cations include alkaline earth metal cations, for instance, calcium, magnesium, strontium and barium. Examples of trivalent cations include aluminium. Examples of divalent anions include sulphate and carbonate anions.

The feed solution may have a high initial concentration of multivalent cations relative to the concentration of monovalent cations in the feed. In one example, the initial concentration of multivalent cations is higher than the concentration of monovalent cations in the feed. In some embodiments, the initial concentration of multivalent cations may be at least 20%, for example, at least 30% of the total cation concentration in the feed. In one example, the initial concentration of multivalent cations may be at 20 to 100%, for instance, 20 to 90% of the total cation concentration in the feed.

The feed solution may have a high initial concentration of multivalent anions relative to the concentration of monovalent anions in the feed. In one example, the initial concentration of multivalent anions is higher than the concentration of monovalent anions in the feed. In some embodiments, the initial concentration of multivalent anions may be at least 20%, for example, at least 30% of the total anion concentration in the feed. In one example, the initial concentration of multivalent anion may be at 20 to 100%, for instance, 20 to 90% of the total anion concentration in the feed.

The feed solution may have a total concentration of multivalent cations and multivalent anions that is high relative to the total concentration of monovalent cations and monovalent anions in the feed. In one example, the initial concentration of multivalent cations and anions is higher than the concentration of monovalent cations and anions in the feed. In some embodiments, the initial concentration of multivalent cations and anions may be at least 20%, for example, at least 30% of the total cation and anion concentration in the feed. In one example, the initial concentration of multivalent cations may be at 20 to 100%, for instance, 20 to 90% of the total cation and anion concentration in the feed.

Preferably, the process of the present invention comprises the step of adding monovalent cation and/or monovalent anion to the feed solution before the feed solution is contacted with the nanofiltration membrane. The monovalent cation and/or monovalent anion may be added in the form of solid salt (e.g. sodium chloride) or as a salt solution (e.g. sodium chloride solution). The monovalent cation and/or monovalent anion may be added to ensure that, when the resultant feed is passed through the nanofiltration membrane, the osmotic pressure of the permeate solution on the permeate-side of the nanofiltration membrane is at least 50% of the osmotic pressure of the feed solution.

Nanofiltration membranes typically have relatively high monovalent solute permeability relative to multivalent (e.g. divalent and trivalent) solute permeability. Therefore, the nanofiltration membrane may limit the passage of multivalent solutes from the feed solution through the membrane, thus limiting the solute concentration and osmotic pressure of the permeate from the nanofiltration membrane. In such cases a monovalent solute solution (for example sodium chloride) could be dosed to the feed solution. Because a nanofiltration membrane has a relatively high permeability to monovalent solutes, the solute concentration and osmotic pressure of the permeate from the nanofiltration membrane would be increased by the addition of the monovalent solutes. The permeate from the nanofiltration membrane is contacted with one side of a reverse osmosis membrane and the monovalent solutes in the nanofiltration membrane permeate would be retained on the retentate side of the reverse osmosis membrane and re-introduced to the nanofiltration feed.

The permeate from the nanofiltration membrane is contacted with one side of a reverse osmosis membrane. Hydraulic pressure can be applied, such that solvent from the nanofiltration permeate flows through the reverse osmosis membrane to leave a concentrated solution on the retentate-side of the reverse osmosis membrane. The permeate solution from the reverse osmosis membrane may be a product stream (e.g. product water) having a reduced solute concentration. This product stream may optionally be further treated, for example, to produce potable water or water for household use. The water may also be used for example, for industrial or domestic use.

The concentrated solution from the retentate-side of the reverse osmosis membrane is then used as at least part of the feed solution to the nanofiltration membrane. By using this concentrated solution as at least part of the feed, the concentration of the solution on the retentate-side of the nanofiltration membrane may be increased, allowing a highly concentrated solution to be withdrawn from the retentate-side of the nanofiltration membrane. As mentioned above, the solution withdrawn from the retentate-side of the nanofiltration membrane may be disposed of or further concentrated prior to disposal. Because of its high concentration, the volume of liquid requiring disposal or treatment is reduced. Thus, where the withdrawn stream is intended for treatment in a downstream evaporator or crystalliser, the capacity and/or heat demand of such equipment may be reduced. Because of its high concentration, the solution from the retentate-side of the nanofiltration membrane may also be withdrawn and used as a draw solution in a osmotically driven membrane process.

Counter-intuitively, the present invention employs a loose or high solute passage (i.e. nanofiltration) membrane to provide highly concentrated solutions on the retentate-side of the membrane. Specifically, the present invention employs a nanofiltration membrane in tandem with a reverse osmosis membrane to generate a product stream (e.g. product water) having a reduced solute concentration as well as a highly concentrated solution e.g. for ease of disposal/ further treatment or use as a draw solution for a direct osmosis process. By using a nanofiltration membrane, the concentration of the highly concentrated retentate solution capable of being produced by the process of the present invention is greater than could be produced using reverse osmosis alone operating under the same hydraulic pressure limitations. Furthermore, by re-circulating the retentate from the reverse osmosis membrane as at least part of the feed to the nanofiltration membrane, highly concentrated waste streams can be produced, reducing the volume of waste requiring disposal or further treatment.

The benefits of embodiments of the invention are that.
(a) a higher concentration brine stream (and therefore lower volume) can be produced than by using RO alone
(b) higher concentration feed water can be desalinated than using RO alone and/or
(c) a higher recovery of product water can be achieved than RO treating the same concentration of feed water.

All of the above benefits can be achieved with no increase to the normal operational pressures employed when RO alone is used.

When withdrawn, the withdrawn portion of concentrated solution form the retentate-side of the nanofiltration membrane may have a total dissolved salts concentration of at least 90,000 mg/l, preferably at least 95,000 mg/l. In one embodiment, the withdrawn portion of concentrated solution form the retentate-side of the nanofiltration membrane may have a total dissolved salts concentration of at least 100,000 mg/l, for example, at least 120,000 mg/l. In one example, the withdrawn portion has a total dissolved salts concentration of at least 130,000 mg/l.

When withdrawn, the withdrawn portion of concentrated solution form the retentate-side of the nanofiltration membrane may have an osmotic pressure of at least 75 barg, preferably at least 80 barg. In one embodiment, the withdrawn portion of concentrated solution form the retentate-side of the nanofiltration membrane may have an osmotic pressure of at least 1 10 barg, for instance, at least 120 barg.

Preferably, the withdrawn portion of concentrated solution from the retentate-side of the nanofiltration membrane is further concentrated using a thermal evaporator or crystalliser.

In one embodiment, the concentrated solution from the retentate-side of the reverse osmosis membrane is combined with a further solute solution and the combined stream used as the feed solution to the nanofiltration membrane. The further solute solution may be, for example, saline ground water or surface water, brine, seawater, or a waste stream.

In one embodiment, the permeate solution from the nanofiltration membrane is combined with a further solute solution and the combined stream contacted with one side of the reverse osmosis membrane. The further solute solution may be, for example, saline ground water or surface water, brine, seawater or a waste stream.

In one embodiment, the withdrawn portion of the concentrated solution from the retentate-side of the nanofiltration membrane is concentrated by contacting said withdrawn portion with one side of a further semi-permeable membrane. The semi-permeable membrane may be as permeable (e.g. comparable average pore size) or less permeable (e.g. smaller average pore size) than the nanofiltration membrane. For example, the semi-permeable membrane may be a nanofiltration membrane or a reverse osmosis membrane. Hydraulic pressure may be applied to the withdrawn portion, such that solvent from said portion flows through the further semi-permeable membrane to provide a permeate solution on the permeate-side of the further semipermeable membrane and a retentate solution on the retentate-side of the further semi-permeable membrane. The retentate solution on the retentate-side of the further semi-permeable membrane may be withdrawn and disposed of, concentrated further e.g. prior to disposal or contacted with one side of a direct osmosis membrane to draw water from a source solution on the opposite side of the direct osmosis membrane by direct osmosis i.e. in an osmotically driven membrane process. The permeate solution from permeate-side of the further semi-permeable membrane may be combined with the concentrated solution from the retentate-side of the reverse osmosis membrane and introduced into the nanofiltration membrane. Preferably, the further semi-permeable membrane is a nanofiltration membrane.

In one embodiment, prior to being used as at least a portion of the feed solution to the nanofiltration membrane, the concentrated solution from the retentate-side of the reverse osmosis membrane is passed through an additional semi-permeable membrane to provide a permeate solution on the permeate-side of the additional semi-permeable membrane and a retentate solution on the retentate-side of the additional semi-permeable membrane. The permeate solution may be used as at least a portion of the feed to the nanofiltration membrane. The retentate solution on the retentate-side of the additional semi-permeable membrane may be withdrawn and disposed of, further concentrated or contacted with a direct osmosis membrane to draw water from a source solution on the opposite side of the direct osmosis membrane by direct osmosis i.e. in an osmotically driven membrane process. The withdrawn portion of concentrated solution on the retentate-side of the nanofiltration membrane may be concentrated by passing the withdrawn portion through the additional (or yet another) semi-permeable membrane and applying hydraulic pressure to said withdrawn portion such that solvent from said portion flows through the membrane to provide a permeate solution on the permeate-side of the semi-permeable membrane and a retentate solution on the retentate-side of the membrane. This retentate may be withdrawn and then optionally disposed of, concentrated further e.g. prior to disposal or contacted with a direct osmosis membrane to draw water from a source solution on the opposite side of the direct osmosis membrane by direct osmosis i.e. in an osmotically driven membrane process. Preferably, the withdrawn portion of concentrated solution on the retentate-side of the nanofiltration membrane is combined with the concentrated solution from the retentate-side of the reverse osmosis membrane and the combined stream is passed through the additional semi-permeable membrane. The additional or yet another semi-permeable membrane as permeable as or less permeable than the nanofiltration membrane. For example, the additional or yet another semi-permeable membrane may be a nanofiltration membrane or a reverse osmosis membrane. Preferably, the additional semi-permeable membrane may be a nanofiltration membrane. Where employed, the yet another semi-permeable membrane may also be a nanofiltration membrane.

Where the withdrawn portion of concentrated solution on the retentate-side of the nanofiltration membrane is contacted with a further membrane, the further membrane may have an average pore size or permeability that is no more than 100 times greater, preferably no more than 50 times greater, more preferably no more than 10 times greater than the average pore size or permeability of the nanofiltration membrane. The withdrawn portion of concentrated solution on the retentate-side of the nanofiltration membrane may be contacted with a further membrane that has an average pore size or permeability that is less than 10 times greater, for example, less than 5 times greater than the average pore size or permeability of the nanofiltration membrane. For example, the further membrane may have substantially the same or a lower average pore size or permeability as the nanofiltration membrane. As noted above, the further membrane may be a nanofiltration membrane or reverse osmosis membrane. The further membrane is preferably not selected from a particle filtration membrane, a microfiltration membrane or an ultrafiltration membrane. The further membrane may have an average pore size that is less than 0.1 microns, for example, less than 0.05 microns.

The feed solution may be any solution, such as an aqueous solution. The feed solution may be a salt solution, for example, an aqueous salt solution. In some embodiments, the feed solution is an aqueous solution of sodium chloride. Examples of suitable feed solutions include saline ground water or surface water, brine and seawater. Other examples include waste water streams, lake water, river water and pond water Examples of waste water streams include industrial or agricultural waste water streams.

The total dissolved salt concentration of the feed solution to the nanofiltration membrane may be at least 5,000 mg/l, for example, 5,000 to 140,000 mg/l. In one example, the total dissolved salt concentration of the feed solution to the nanofiltration membrane is at least 30,000 mg/l. The osmotic pressure of the feed may be at least 4 barg, for example, 4 to 130 barg.

The nanofiltration membrane may be selected such that sufficient dissolved salt passes through the nanofiltration membrane, whereby the total dissolved salts concentration or osmotic pressure of the permeate solution on the permeate-side of the nanofiltration membrane is at least 30%, for example, at least 50% or at least 70% of the osmotic pressure of the solution fed to the nanofiltration membrane. For example, the osmotic pressure of the permeate solution on the permeate-side of the nanofiltration membrane is 50 to 90% of the osmotic pressure of the solution fed to the nanofiltration membrane.

When withdrawn, the withdrawn portion of concentrated solution form the retentate-side of the nanofiltration membrane may have a total dissolved salts concentration that is at least 1.1 times, for example, at least 2 or 3 times the total dissolved salt concentration of the feed.

When withdrawn, the withdrawn portion of concentrated solution form the retentate-side of the nanofiltration membrane may have an osmotic pressure that is at least 1.1 times, for example, at least 2 or 3 times the osmotic pressure of the feed.

The membrane employed in the nanofiltration step may have an average (e.g. mean) pore size of 4 to 80 Angstroms.

Preferably, the average (e.g. mean) pore size of the membrane is 20 to 70 Angstroms, more preferably 30 to 60 Angstroms, and most preferably 40 to 50 Angstroms. Pore size (e.g. mean pore size) may be measured using any suitable technique. For example, a differential flow method may be employed (Japan Membrane Journal, vol 29, no. 4; pp. 227-235 (2004)) or the use of salts, uncharged solutes and atomic force microscopy (Journal of Membrane Science 126 (1997) 91-105).

The membranes used in the nanofiltration step may be cast as a "skin layer" on top of a support formed, for example, of a microporous polymer sheet. The resulting membrane may have a composite structure (e.g. a thin-film composite structure). Typically, the separation properties of the membrane are controlled by the pore size and electrical charge of the "skin layer".

Examples of suitable nanofiltration membranes include ESNA-1 (Hydranautics, Oceanside, Calif.), SR 90, NF-270, NF 90, NF 70, NF 50, NF 40, NF 40 HF membranes (Dow FilmTech, Minneapolis, Minn.), TR-60, SU 600 membrane (Toray, Japan) and NRT 7450 and NTR 7250 membranes (Nitto Electric, Japan).

The nanofiltration membrane may be planar or take the form of a tube or hollow fibre. For example, a tubular configuration of hollow fine fibre membranes may be used. If desired, the membrane may be supported on a supporting structure, such as a mesh support. When a planar membrane is employed, the sheet may be rolled such that it defines a spiral in cross-section. When a tubular membrane is employed, one or more tubular membranes may be contained within a housing or shell. The solution may be introduced into the housing, whilst the solvent may be removed as a filtrate from the tubes or vice-versa.

The nanofiltration step may also be carried out at an elevated pressure. For example, the nanofiltration step may be carried out at a pressure of 25 to 120 bar, preferably 40 to 100 bar, more preferably 50 to 80 bar. As mentioned above, solution from the retentate-side of the selective membrane of the reverse osmosis step is passed through the nanofiltration membrane. Since this solution is on the high pressure side of the membrane, it may not be necessary to apply further pressure to the solution as it passes through the nanofiltration membrane. However, it is possible to apply further pressure to the solution as it passes through the nanofiltration membrane, if desired.

Any suitable reverse osmosis membrane may be used in the present invention. For example, the reverse osmosis membrane may have an average (e.g. mean) pore size of 0.5 to 80 Angstroms, preferably, 2 to 50 Angstroms. In a preferred embodiment, the membrane has an average (e.g. mean) pore size of from 3 to 30 Angstroms. Pore size (e.g. mean pore size) may be measured using any suitable technique. For example, a differential flow method may be employed (Japan Membrane Journal, vol. 29; no. 4; pp. 227-235 (2004)) or the use of salts, uncharged solutes and atomic force microscopy (Journal of Membrane Science 126 (1997) 91-105).

Suitable reverse osmosis membranes include integral membranes and composite membranes. Specific examples of suitable membranes include membranes formed of cellulose acetate (CA) and/or cellulose triacetate (CTA), such as or similar to those used in the study of McCutcheon et al., Desalination 174 (2005) 1-11 and membranes formed of polyamide (PA). An array of membranes may be employed.

The reverse osmosis membrane may be planar or take the form of a tube or hollow fibre. For example, a tubular configuration of hollow fine fibre membranes may be used. If desired, the membrane may be supported on a supporting structure, such as a mesh support. When a planar membrane is employed, the sheet may be rolled such that it defines a spiral in cross-section. When a tubular membrane is employed, one or more tubular membranes may be contained within a housing or shell.

The reverse osmosis membrane may be carried out at an elevated pressure to drive the (liquid) solution through the membrane. For example, the reverse osmosis step may be carried out at a pressure of 25 to 120 bar, preferably 50 to 100 bar, more preferably 60 to 80 bar.

These and other aspects of the present invention will now be described with reference to the accompanying drawings in which.

Figure 1:
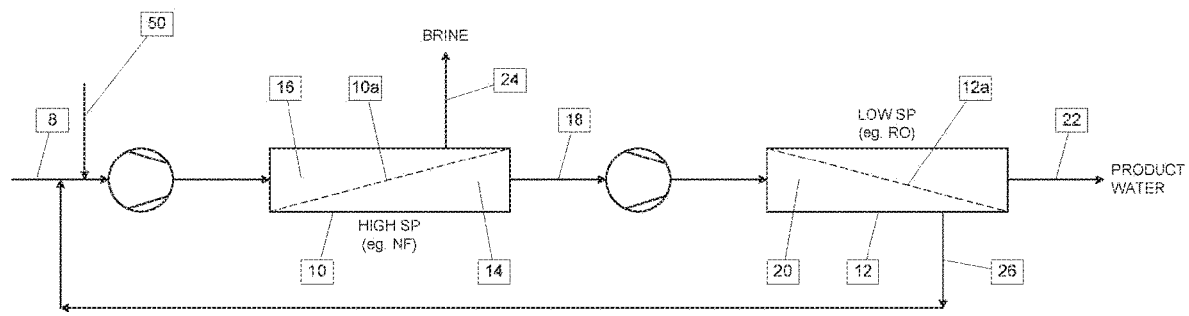
FIG. 1 is a schematic drawing of a system for performing a first embodiment of the process of the present invention.

Referring to FIG. 1, this drawing depicts a system comprising a nanofiltration membrane unit 10 comprising a nanofiltration membrane 10a and a reverse osmosis membrane unit 12 comprising a reverse osmosis membrane 12a. In use, a feed solution (e.g. wastewater) comprising solutes dissolved in a solvent is contacted with one side of the nanofiltration membrane 10a. Hydraulic pressure is applied to the feed solution, such that solvent (water) and some of the dissolved salts from the feed solution flow through the nanofiltration membrane to provide a permeate solution 14 on the permeate-side of the nanofiltration membrane 10a and a concentrated solution 16 on the retentate-side of the nanofiltration membrane.

The permeate solution 14 from the nanofiltration membrane 10a is withdrawn via conduit 18 and contacted with one side of the reverse osmosis membrane 12a. Hydraulic pressure is applied to the solution, such that solvent from the solution flows through the reverse osmosis membrane 12a to leave a concentrated solution 20 on the retentate-side of the reverse osmosis membrane 12a and a product solution 22 on the permeate side of the reverse osmosis membrane 12a The product solution 22 advantageously has a relatively low solute (e.g. salt) concentration.

The concentrated solution 20 from the retentate-side of the reverse osmosis membrane 12a is withdrawn via conduit 26 and used as at least part of the feed solution to the nanofiltration membrane 10a. In this embodiment, it can be combined with fresh feed (e.g. wastewater) in conduit 8 and the combined stream may be fed to the nanofiltration unit 10.

At least a portion of the concentrated solution 16 from the retentate-side of the nanofiltration membrane 10a is withdrawn via conduit 24. This solution 24 may be disposed of or further concentrated, for example, using thermal methods (not shown). As the solution 24 is highly concentrated, the volume of concentrated waste requiring treatment/disposal is relatively small as compared, for instance, to the volume of concentrated waste that would be produced using reverse osmosis (RO) alone.

The feed (e.g. wastewater) may contain divalent cations and/or anions, for example, calcium, magnesium, strontium and/or barium cations, and/or sulphate and/or carbonate anions. The initial concentration of divalent cations and anions is higher than the concentration of monovalent cations and anions in the feed. For example, the initial concentration of divalent cations or anions may be at 20 to 90% of the total cation and anion concentration in the feed.

Monovalent cations and monovalent anions may be added to the feed solution via line 50 before the feed solution is contacted with the nanofiltration membrane. The monovalent cation and/or monovalent anion may be added in the form of solid salt (e.g. sodium chloride) or as a salt solution (e.g. sodium chloride solution). The monovalent cation and/or monovalent anion may be added to ensure that, when the resultant feed is passed through the nanofiltration membrane, the osmotic pressure of the permeate solution on the permeate-side of the nanofiltration membrane is at least 50% of the osmotic pressure of the feed solution.

Nanofiltration membranes typically have relatively high monovalent solute permeability relative to multivalent (e.g. divalent and trivalent) solute permeability. Therefore, the nanofiltration membrane may limit the passage of multivalent solutes from the feed solution through the membrane, thus limiting the solute concentration and osmotic pressure of the permeate from the nanofiltration membrane. In such cases a monovalent solute solution (for example sodium chloride) could be dosed to the feed solution. Because a nanofiltration membrane has a relatively high permeability to monovalent solutes, the solute concentration and osmotic pressure of the permeate from the nanofiltration membrane would be increased by the addition of the monovalent solutes. The permeate from the nanofiltration membrane is contacted with one side of a reverse osmosis membrane and the monovalent solutes in the nanofiltration membrane permeate would be retained on the retentate side of the reverse osmosis membrane and re-introduced to the nanofiltration feed.

Figure 2:
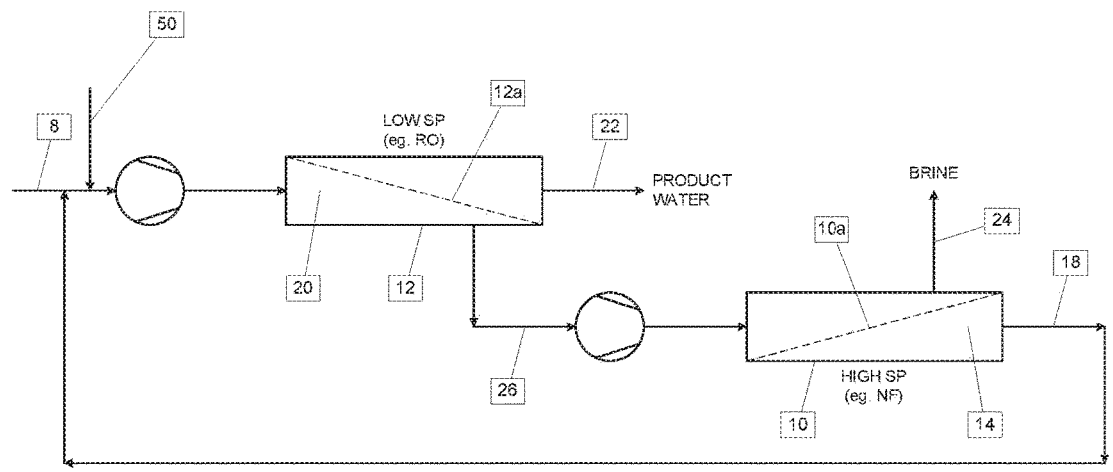
FIG. 2 is a schematic drawing of a system for performing a second embodiment of the process of the present invention.

FIG. 2 depicts a system for performing an alternative embodiment of the process described with reference to FIG. 1. Like parts have been labelled with like reference numerals. Like in FIG. 1, a monovalent cations and/or anions (e.g. sodium chloride) may be added to the feed via line 50. However, in this embodiment, the concentrated solution 20 from the retentate-side of the reverse osmosis membrane 12*a* is withdrawn via conduit 26 and used wholly as the feed solution to the nanofiltration membrane 10*a*. Unlike the embodiment depicted in FIG. 1, the concentrated solution 20 is not combined with fresh feed (e.g. wastewater). However, the feed to the reverse osmosis unit 12 is only formed in part by the permeate (see conduit 18) from the nanofiltration membrane 10*a*. This permeate is combined with fresh feed (e.g. wastewater) from conduit 8 and the combined feed is introduced into the reverse osmosis unit 12.

Figure 3:
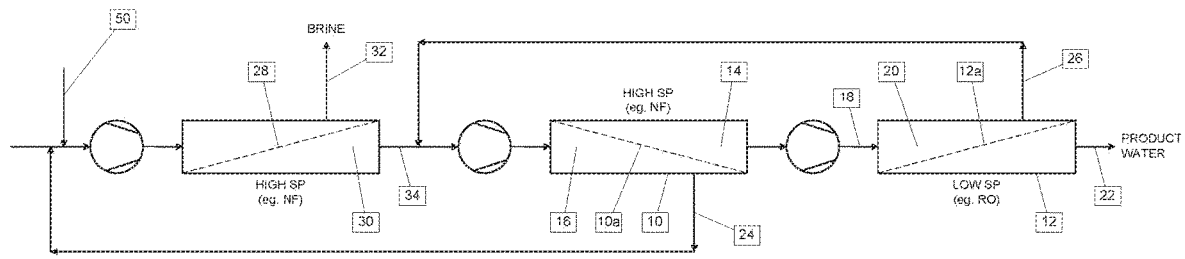
FIG. 3 is a schematic drawing of a system for performing a third embodiment of the process of the present invention.

FIG. 3 depicts a system for performing a third embodiment of the process of the present invention. The system is similar to that described in FIG. 1 and like parts have been labelled with like numerals. Like in FIG. 1, a monovalent cations and/or anions (e.g. sodium chloride) may be added to the feed via line 50. However, in this embodiment, the withdrawn portion (see conduit 24) of the concentrated solution 16 from the retentate-side of the nanofiltration membrane 10*a* is concentrated by contacting the withdrawn portion with one side of a further semi-permeable membrane (e.g. a further nanofiltration membrane) 28. The withdrawn portion (see conduit 24) may optionally be combined with fresh feed prior to contact with the further semi-permeable membrane 28. Hydraulic pressure is then applied, such that water from the withdrawn portion flows through the further semi-permeable membrane 28 (e.g. a further nanofiltration membrane) to provide a permeate solution 30 on the permeate-side of the further semi-permeable membrane 28 and a retentate solution on the retentate-side of the further semi-permeable membrane. The retentate solution on the retentate-side of the further semi-permeable membrane 28 is withdrawn via conduit 32 and disposed of or concentrated further prior to disposal. The permeate 30 is withdrawn via conduit 34 where it is combined with the concentrated solution from the reverse osmosis unit 12 in conduit 26 and introduced into the nanofiltration membrane unit 10.

Figure 4:
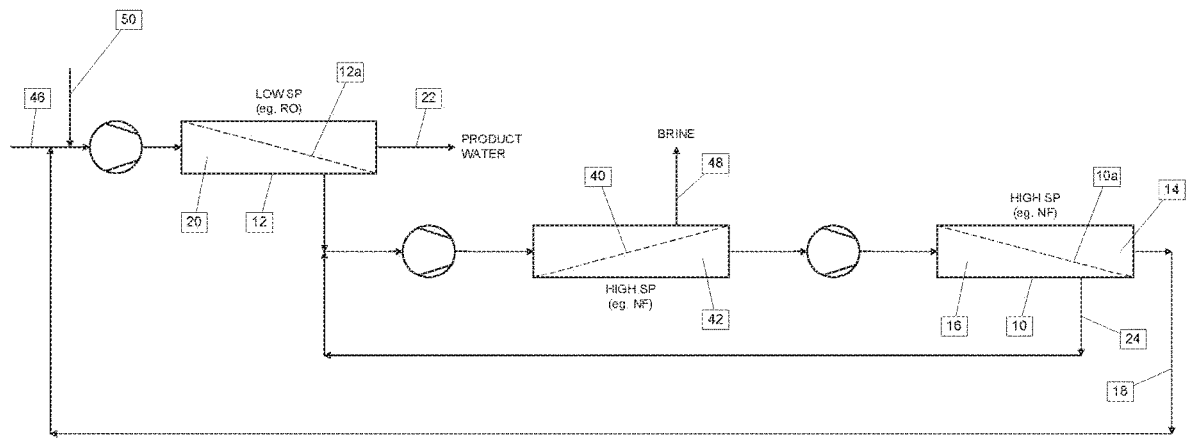
FIG. 4 is a schematic drawing of a system for performing a fourth embodiment of the process of the present invention.

FIG. 4 depicts a system for performing a fourth embodiment of the process of the present invention. The system is similar to that described in FIG. 1 and like parts have been labelled with like numerals. Like in FIG. 1, a monovalent cations and/or anions (e.g. sodium chloride) may be added to the feed via line 50. However, prior to being used as at least a portion of the feed to the nanofiltration membrane 10*a*, the concentrated solution 20 from the retentate-side of the reverse osmosis membrane 12*a* is passed through an additional semi-permeable membrane 40 (e.g. an additional nanofiltration membrane) to provide a permeate solution 42 on the permeate-side of the additional semi-permeable membrane 40 and a retentate solution 44 on the retentate-side of the additional semi-permeable membrane 40. The permeate solution 42 is used as the feed to the nanofiltration membrane 10*a*. In this embodiment, rather than being e.g. untreated wastewater 46, the feed to the nanofiltration unit 10 is wastewater 46 that has been pre-treated in the reverse osmosis unit 12 and by the additional semi-permeable membrane 40.

The retentate solution on the retentate-side of the additional semi-permeable membrane is withdrawn via conduit 48 and disposed of or further concentrated.

In this embodiment, the withdrawn portion of concentrated solution 16 on the retentate-side of the nanofiltration membrane 10*a* is withdrawn via conduit 24 and is concentrated by passing said withdrawn portion through the additional semipermeable membrane 40. The feed to the additional semi-permeable membrane 40, therefore, consists of the concentrated solution 20 from the retentate-side of the reverse osmosis membrane 12*a* as well as the concentrated solution 16 that is withdrawn from the nanofiltration unit 10 via conduit 24. When hydraulic pressure is applied, a permeate solution 42 is provided on the permeate-side of the semipermeable membrane 40 and a retentate solution on the retentate-side of the membrane. The retentate is withdrawn via conduit 48 as described above.

The additional semi-permeable membrane 40 may be a nanofiltration membrane.

Figure 5:
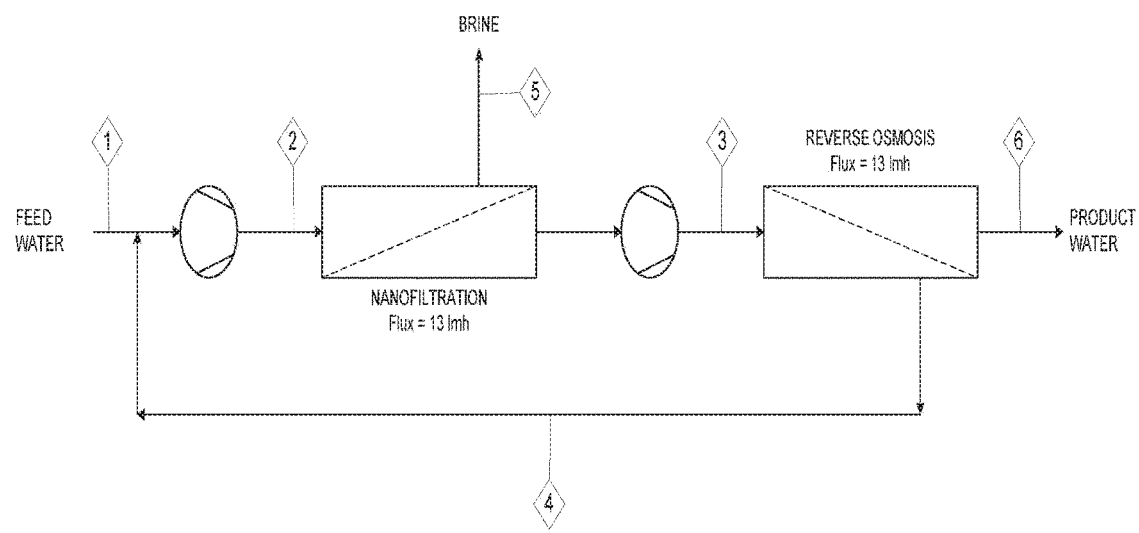

FIG. 5 shows the points at which flow streams were sampled for the system of Example 1.

Figure 6:
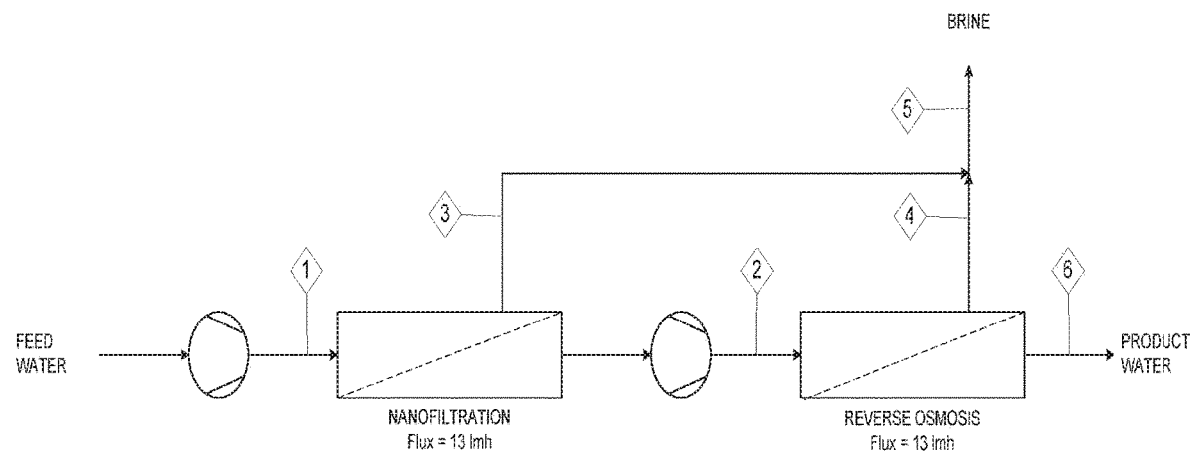

FIG. 6 depicts a comparative example of waste stream treatment process as described in Comparative Example 2.

Figure 7:
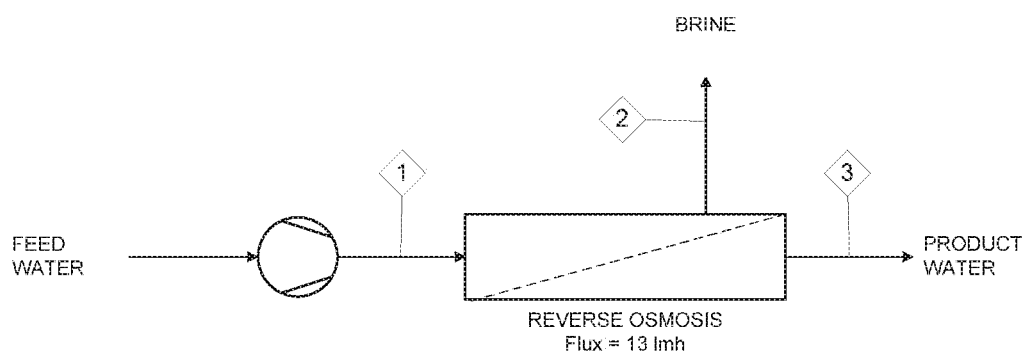

FIG. 7 depicts a standard reverse osmosis process in which the feed waste water stream is contacted with a reverse osmosis membrane as described in Comparative Example 3.

EXAMPLES

Example 1

In this modelled Example, a waste water stream having a total dissolved salts (TDS) concentration of 43218 g/l and an osmotic pressure of 34 barg was treated using the embodiment of the invention shown schematically in FIG. 1. FIG. 5 shows the points at which the flow streams were sampled and analysed. Table 1 below shows the TDS, pressures, osmotic pressures and flow rates of the various streams. As can be seen from Table 1, 68% of the water in the waste water stream was recovered using this embodiment of the invention (N.B. system recovery=(flow of product water)/(flow of feed water) or the percentage of the feed water that is converted to product water).

TABLE 1

| | STREAM | | | | | |
|---|---|---|---|---|---|---|
| | 1 | 2 | 3 | 4 | 5 | 6 |
| TDS (mg/l) | 43218 | 61453 | 45267 | 86269 | 133503 | 868 |
| Pressure (barg) | 0 | 50 | 77 | 75 | 46 | 868 |
| Osmotic Pressure (Barg) | 34 | 50 | 36 | 73 | 119 | 1 |
| Flow (m³/hr) | 100 | 174 | 142 | 74 | 32 | 68 |
| System Recovery (%) | 68 | | | | | |

Comparative Example 2

In this modelled Comparative Example, the waste water stream treated in Example 1 was treated using the process shown schematically in FIG. 6. FIG. 6 depicts a process that is similar to that shown in FIGS. 1 and 5, except that the concentrated solution from the retentate-side of the reverse osmosis membrane is not used as at least part of the feed solution to the nanofiltration membrane. Instead, this concentrated solution is combined with the concentrated solution from the retentate-side of the nanofiltration membrane and withdrawn for disposal. Table 2 below shows the TDS, pressures, osmotic pressures and flow rates of the various streams. As can be seen from Table 2, only 56% of the water in the waste water stream was recovered using the process depicted in FIG. 6. Furthermore, the TDS of the concentrated waste stream is less than the maximum TDS achieved in Example 1.

TABLE 2

| | STREAM | | | | | |
|---|---|---|---|---|---|---|
| | 1 | 2 | 3 | 4 | 5 | 6 |
| TDS (mg/l) | 43218 | 33634 | 129119 | 89012 | 98257 | 750 |
| Pressure (barg) | 50 | 77 | 50 | 76 | 50 | 0 |
| Osmotic Pressure (Barg) | 34 | 27 | 109 | 76 | 83 | 1 |
| Flow (m³/hr) | 100 | 90 | 10 | 34 | 44 | 56 |
| System Recovery (%) | 56 | | | | | |

Comparative Example 3

In this modelled Comparative Example, the waste water stream treated in Example 1 was treated using the process shown schematically in FIG. 7. FIG. 7 depicts a standard reverse osmosis process in which the feed waste water stream is contacted with a reverse osmosis membrane. Hydraulic pressure is applied to produce product water on the permeate side of the reverse osmosis membrane. The concentrated solution on the retentate side of the reverse osmosis membrane is withdrawn. Table 3 below shows the TDS, pressures, osmotic pressures and flow rates of the various streams. As can be seen from Table 3, only 49% of the water in the waste water stream was recovered using the process of FIG. 7. Furthermore, the TDS of the concentrated waste stream is less than the maximum TDS achieved in Example 1

The Examples above were modelled using DOW membrane software package (ROSA) and a simple mass balance to determine stream data not provided directly by the DOW projections. All projections were run at 30° C.

TABLE 3

| | STREAM | | |
|---|---|---|---|
| | 1 | 2 | 3 |
| TDS (mg/l) | 43218 | 84178 | 722 |
| Pressure (barg) | 77 | 74 | 0 |
| Osmotic Pressure (Barg) | 34 | 70 | 1 |
| Flow (m³/hr) | 100 | 51 | 49 |
| System Recovery (%) | 49 | | |

The invention claimed is:

1. A process for separating solvent from a feed solution, said process comprising:
    contacting a feed solution comprising solutes dissolved in a solvent with one side of a nanofiltration membrane,
    applying hydraulic pressure to the feed solution, such that solvent and some of the dissolved salts from the feed solution flow through the nanofiltration membrane to provide a permeate solution on the permeate-side of the nanofiltration membrane and a concentrated solution on the retentate-side of the nanofiltration membrane;
    contacting the permeate solution from the nanofiltration membrane with one side of a reverse osmosis membrane and applying hydraulic pressure to the permeate solution, such that solvent from the permeate solution flows through the reverse osmosis membrane to leave a concentrated solution on the retentate-side of the reverse osmosis membrane,
    using the concentrated solution from the retentate-side of the reverse osmosis membrane as at least part of the feed solution to the nanofiltration membrane;
    withdrawing at least a portion of the concentrated solution from the retentate-side of the nanofiltration membrane; and
    wherein, prior to being used as at least a portion of the feed solution to the nanofiltration membrane, the concentrated solution from the retentate-side of the reverse osmosis membrane is passed through an additional semi-permeable membrane to provide a permeate solution on the permeate-side of the additional semi-permeable membrane and a retentate solution on the retentate-side of the additional semi-permeable membrane, which permeate solution is used as at least a portion of the feed to the nanofiltration membrane.

2. The process as claimed in claim 1, whereby, if the withdrawn portion of the concentrated solution from the retentate-side of the nanofiltration membrane is contacted with a further membrane, the further membrane has an average pore size or permeability that is no more than 100 times greater than the average pore size or permeability of the nanofiltration membrane.

3. The process as claimed in claim 1, wherein the withdrawn portion of the concentrated solution from the retentate-side of the nanofiltration membrane is
    i) disposed of;
    ii) further concentrated prior to disposal; or
    iii) contacted with one side of a direct osmosis membrane to draw water from source water on the opposite side of the direct osmosis membrane by direct osmosis.

4. The process as claimed in claim 3, wherein the withdrawn portion of concentrated solution from the retentate-side of the nanofiltration membrane is concentrated using a membrane, thermal evaporator or crystalliser.

5. The process as claimed in claim 1, wherein the nanofiltration membrane is selected such that sufficient dissolved solute passes through the nanofiltration membrane, whereby the osmotic pressure of the permeate solution on the permeate-side of the nanofiltration membrane is at least 50% of the osmotic pressure of the feed solution.

6. The process as claimed in claim 1, wherein the concentrated solution from the retentate-side of the reverse osmosis membrane is combined with a further salt solution and the combined stream used as the feed solution to the nanofiltration membrane.

7. The process as claimed in claim 1, wherein the permeate solution from the nanofiltration membrane is combined with a further salt solution and the combined stream contacted with one side of the reverse osmosis membrane.

8. The process as claimed in claim 3, wherein the withdrawn portion of the concentrated solution from the retentate-side of the nanofiltration membrane is concentrated by contacting said withdrawn portion with one side of a further semi-permeable membrane, and applying hydraulic pressure to said withdrawn portion, such that solvent from said portion flows through the further semi-permeable membrane to provide a permeate solution on the permeate-side of the further semi-permeable membrane and a retentate solution on the retentate-side of the further semi-permeable membrane, wherein the retentate solution on the retentate-side of the further semi-permeable membrane is withdrawn and disposed of or concentrated further prior to disposal.

9. The process as claimed in claim 8, wherein the permeate solution from permeate-side of the further semi-permeable membrane is combined with the concentrated solution from the retentate-side of the reverse osmosis membrane and introduced into the nanofiltration membrane.

10. The process as claimed in claim 8, wherein the further semi-permeable membrane is a nanofiltration membrane.

11. The process as claimed in claim 1, wherein the retentate solution on the retentate-side of the additional semi-permeable membrane is withdrawn and disposed of or further concentrated.

12. The process as claimed in claim 1, wherein the withdrawn portion of concentrated solution on the retentate-side of the nanofiltration membrane is concentrated by passing said withdrawn portion through the additional or another semi-permeable membrane and applying hydraulic pressure to said withdrawn portion such that solvent from said portion flows through the membrane to provide a permeate solution on the permeate-side of the semi-permeable membrane and a retentate solution on the retentate-side of the membrane, which retentate is withdrawn and disposed of or concentrated further prior to disposal.

13. A process as claimed in claim 12, wherein the withdrawn portion of concentrated solution on the retentate-side of the nanofiltration membrane is combined with the concentrated solution from the retentate-side of the reverse osmosis membrane and the combined stream is passed through the additional semi-permeable membrane.

14. A process as claimed in claim 1, wherein the additional semi-permeable membrane is a nanofiltration membrane.

15. The process as claimed in claim 1, wherein the solution that permeates the reverse osmosis membrane is withdrawn as product water.

16. The process as claimed in claim 1, wherein, when withdrawn, the withdrawn portion of concentrated solution from the retentate-side of the nanofiltration membrane has a total dissolved salts concentration of at least 90,000 mg/l.

17. The process as claimed in claim 1, wherein the feed solution has an initial concentration of multivalent cations and multivalent anions that is greater than the concentration of monovalent cations and monovalent anions, and wherein the process further comprises the step of adding monovalent cation and/or monovalent anion to the feed solution before the feed solution is contacted with the nanofiltration membrane.

18. The process as claimed in claim 17, wherein the monovalent cation and/or monovalent anion is added to the feed solution to raise the osmotic pressure of the permeate solution on the permeate-side of the nanofiltration membrane to at least 50% of the osmotic pressure of the feed solution.

19. The process as claimed in claim 17, wherein the withdrawn portion of the concentrated solution from the retentate-side of the nanofiltration membrane is concentrated by contacting said withdrawn portion with one side of a further nanofiltration membrane, and applying hydraulic pressure to said withdrawn portion, such that solvent from said portion flows through the further nanofiltration membrane to provide a permeate solution on the permeate-side of the further nanofiltration membrane and a retentate solution on the retentate-side of the further nanofiltration membrane, wherein the retentate solution on the retentate-side of the further nanofiltration membrane is withdrawn and disposed of or concentrated further prior to disposal.

20. The process as claimed in claim 19, wherein, prior to contact with the further nanofiltration membrane, monovalent cation and/or monovalent anion are added to the withdrawn portion.

* * * * *